Patented Dec. 7, 1937

2,101,823

UNITED STATES PATENT OFFICE 2,101,823

PROCESS OF PREPARING CYANHYDRINS

Harry R. Dittmar, Wilmington, Del., assignor to E. I. du Pont de Nemours & Company, Wilmington, Del., a corporation of Delaware No Drawing. Application April 17, 1934, Serial No. 720,945

6 Claims. (Cl. 260—99.30)

This invention relates to a process for the preparation of cyanhydrins and more particularly to the preparation of ketone and aldehyde cyanhydrins.

The preparation of cyanhydrins by the interaction of aldehydes and/or ketones with hydrocyanic acid may be carried out either in the presence or absence of a catalyst. The presence of a catalyst is desirable, however, in order to accelerate the otherwise rather sluggish reaction. Commercial exploitation of the process has revealed a major difficulty of great potential danger, which was not fully appreciated by the investigators who developed the process on a laboratory scale. The difficulty is encountered during the initial stages of the reaction and results from the reactants failing to combine for an appreciable period of time (the so-called induction period) after the introduction of the hydrocyanic acid, and then suddenly in many instances reacting violently with the evolution of considerable heat. Due to the toxicity of the hydrocyanic acid gas and the large amounts thrown off by such "hang-fires" and the resulting non-uniformity of yield and product, the importance of eliminating this danger is readily appreciated.

An object of the present invention is to provide a process for the preparation of cyanhydrins wherein the reaction is quickly and smoothly initiated without an induction period of any substantial extent and without the danger of "hang-fires". Another object of the invention is to provide a process for the preparation of cyanhydrins in accord with the equation:

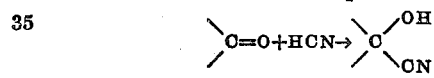

wherein at least a portion of the catalyst is added, dissolved in the cyanhydrin, prior to the reaction. A still further object of the invention is to provide a process for the preparation of acetone cyanhydrin wherein a portion of the catalyst employed is dissolved in acetone cyanhydrin and the resulting solution is added to the acetone prior to the introduction of the hydrocyanic acid. Other objects and advantages of the invention will hereinafter appear.

I have found that cyanhydrins can be prepared in excellent and uniform yields without an induction period or the danger of "hang-fires" if the catalyst used is in solution in or in such form that it is readily soluble in the

containing compound with which the hydrocyanic acid reacts or is readily soluble in the product of the reaction. A catalyst so prepared will hereinafter be referred to as one that is "potentially active". The catalyst is preferably so prepared by dissolving in previously prepared cyanhydrin and adding the resulting solution to the

containing compound; other methods of effecting this result may likewise be employed such, for example, as dissolving the catalyst in a liquid which is a solvent of the catalyst as well as of the

>C=O containing compound, the liquid being either inert to the cyanhydrin reaction or, if it enters the reaction, being readily removed from the final product; or the catalyst may be added in the form of an emulsion or suspension or in any form which is readily soluble in the reactants. Generally, for optimum results I usually prefer to add the catalyst in solution in previously prepared crude or purified cyanhydrin.

The invention generally is applicable to the preparation of cyanhydrins in accord with the reaction:

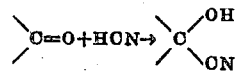

in which the group

refers to symmetrical or asymmetrical ketones such, for example, as acetone, methyl ethyl ketone, diethyl ketone, ethyl propyl ketone, dipropyl ketone, benzophenone, methyl benzyl ketone, and higher alkyl, aryl, aralkyl, or cyclic ketones; and the aldehydes such, for example, as formaldehyde, acetaldehyde, propionaldehyde, benzaldehyde, and other alkyl, aryl, or aralkyl aldehydes, together with equivalents and homologues of the ketones and aldehydes. Thus, for example, by reacting acetone, acetaldehyde, and methyl ethyl ketone with hydrocyanic acid the product will be acetone cyanhydrin, acetaldehyde cyanhydrin, and methyl ethyl ketone cyanhydrin, respectively.

The catalysts which may be employed include the alkali, alkaline earth, and ammonium cyanides, carbonates, and hydroxides, as well as the organic amines such as methyl, ethyl, and the higher alkyl amines, and heterocyclic nitrogen bases such as piperidine, pyridine, etc. It has been found that it is not necessary to have all the catalyst which is called for, by the particular reaction, in solution, for generally if as low as approximately 20% of the total catalyst required is in solution the reaction will proceed quietly without a preliminary induction period. Solvents other than acetone cyanhydrin which may be used in this reaction include lower boiling alcohols, amines, etc.

The usual temperature, pressure, and other operating conditions, well known for the synthesis of cyanhydrin from ketones and aldehydes with hydrogen cyanide, may, of course, be used in my process which is directed principally to the initial stages of the reaction.

I shall now describe by way of example preferred details according to which my invention may be practiced, but it will be understood that I am not limited to the exact details thereof.

*Example 1.*—Into 40 parts (all parts are by weight) of crude acetone cyanhydrin there is added 1.5 parts of sodium cyanide, only about 50% of which will dissolve. The resulting solution, with the undissolved salt, is added to 1051 parts of acetone and into this mixture anhydrous hydrocyanic acid is slowly introduced, the temperature being held below 25° C. The reaction begins immediately and after 489 parts by weight of the acid has been added a product is obtained containing over 90% of acetone cyanhydrin.

*Example 2.*—100 grams of powdered potassium hydroxide are dissolved in 12 lbs. of crude acetone cyanhydrin prepared by a previous run. The potassium hydroxide will not completely dissolve but the solution with the undissolved alkali is added to 293 lbs. of acetone to which 100 grams of powdered potassium hydroxide have been added, making a total of 200 grams of catalyst. Into the resulting mixture 150 lbs. of liquid hydrocyanic acid are added gradually over a period of approximately 1½ hours, the reaction commencing substantially immediately upon the introduction of the hydrocyanic acid. The temperature of the reaction is held below 25° C. during the addition. The reaction mixture is then cooled to —10 to —15° C. for approximately two hours and acidified with sulfuric acid. A yield of approximately 92% acetone cyanhydrin is produced.

*Example 3.*—A solution prepared by dissolving three-tenths of a gram of sodium hydroxide in 10 cc. of acetone cyanhydrin is added to 20 gram moles of acetone. Into the resulting mixture liquid anhydrous hydrocyanic acid is introduced over a period of approximately two hours until approximately 20 moles of the acid have been added. A smooth easily controlled reaction results and a good yield of acetone cyanhydrin is obtained.

*Example 4.*—3 grams of potassium hydroxide and 10 cc. of crude cyanhydrin prepared by a previous run are added to 294 grams of acetone. Into the resulting mixture with cooling, to maintain a temperature below 25° C., 5 gram moles of hydrogen cyanide are added. The reaction begins substantially immediately upon the addition of the hydrogen cyanide and the reaction consequently can be controlled readily at the temperature optimum for best yields.

If the alkali is added, as has heretofore been indicated, to the acetone without prior solution in cyanhydrin, considerable of the liquid cyanide will be introduced before the reaction commences. The heat of the reaction is considerable and when once started the hydrocyanic acid reacts very rapidly with the acetone. Consequently when there is considerable delay as results, for example, when the addition of the alkali is made directly to the acetone without any cyanhydrin present, there will be a considerable period during which the concentration of liquid hydrocyanic acid will build up. After some time a small amount of cyanhydrin is apparently formed which apparently dissolves some catalyst and this is presumably sufficient to cause all of the hydrocyanic acid now in the solution to react substantially instantaneously with the acetone, with the resultant rapid rise in temperature sufficient to burst the whole mixture into a froth. By first dissolving the catalyst in the cyanhydrin the reaction begins immediately upon the addition of the hydrocyanic acid with no substantial building up of unreacted acid with the inevitable "hang-fire".

My process may be carried out in a continuous manner by simultaneously introducing the ketone or aldehyde with the hydrogen cyanide into the cyanhydrin containing a catalyst. The cyanhydrin and catalyst may be recirculated and the cyanhydrin bled off as rapidly as it is formed; the make-up catalyst is preferably added to the circulating cyanhydrin.

From a consideration of the above specification it will be realized that many improvements or modifications of the invention therein described and hereinafter claimed will come within the scope of the invention without sacrificing any of the advantages that may be derived therefrom.

I claim:

1. In a process of preparing a cyanhydrin in accord with the equation:

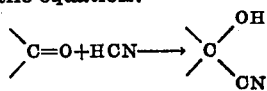

in which

refers to a symmetrical or asymmetrical alkyl, aryl, aralkyl, or cyclic ketone or aldehyde, the steps which comprise initiating the reaction by dissolving at least a portion of the catalyst in the product of the reaction, adding the resulting solution, together with any undissolved catalyst to the

containing compound, and subsequently introducing the HCN.

2. In a process for the preparation of a ketone cyanhydrin in accord with the equation:

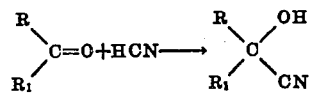

in which R and R₁ designate similar or dissimilar alkyl, aryl, or aralkyl groups, the steps which comprise initiating the reaction by dissolving at least a portion of the catalyst in ketone cyanhydrin previously prepared, adding the resulting solution together with any undissolved catalyst to the ketone and subsequently introducing the HCN.

3. In a process of preparing a cyanhydrin in accord with the equation:

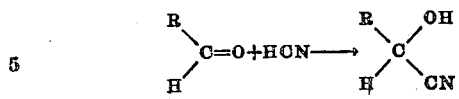

in which R refers to an alkyl, aryl or arylkyl group, the steps which comprise initiating the reaction by dissolving at least a portion of the catalyst in the aldehyde cyanhydrin previously prepared, adding the resulting solution together with any undissolved catalyst to the aldehyde and subsequently introducing the HCN.

4. In a process for the preparation of acetone cyanhydrin by the interaction of acetone with hydrocyanic acid the steps which comprise initiating the reaction by dissolving at least a portion of the catalyst in previously prepared acetone cyanhydrin, adding it to the acetone to be reacted, and subsequently introducing the hydrocyanic acid.

5. In a process for the preparation of acetone cyanhydrin by the interaction of acetone with hydrocyanic acid the steps which comprise initiating the reaction by dissolving at least 20% of the total catalyst required in previously prepared acetone cyanhydrin, adding it to the acetone to be reacted, and subsequently introducing the hydrocyanic acid.

6. In a process for the preparation of acetone cyanhydrin by the interaction of acetone with hydrocyanic acid the steps which comprise initiating the reaction by dissolving in approximately 40 parts of acetone cyanhydrin as much of approximately 1½ parts of sodium cyanide as will dissolve, adding the resulting mixture, with the undissolved salt, to approximately 1051 parts of acetone and into the composite mixture slowly introducing hydrocyanic acid at a temperature held below 25° C.

HARRY R. DITTMAR.